United States Patent [19]

Najjar et al.

[11] Patent Number: 4,889,699
[45] Date of Patent: Dec. 26, 1989

[54] PARTIAL OXIDATION PROCESS

[75] Inventors: Mitri S. Najjar, Hopewell Junction, N.Y.; Michael W. Becker, Westminster, Calif.

[73] Assignee: Texaco Inc., White Plains, N.Y.

[21] Appl. No.: 208,933

[22] Filed: Jun. 20, 1988

Related U.S. Application Data

[63] Continuation-in-part of Ser. No. 51,982, May 19, 1987, Pat. No. 4,826,627, and a continuation-in-part of Ser. No. 100,673, Sep. 24, 1987, Pat. No. 4,808,386.

[51] Int. Cl.$^4$ .............................................. C10J 3/46
[52] U.S. Cl. .............................. 423/210; 48/197 R; 48/212; 252/373
[58] Field of Search ........... 423/210, 230, 231, 242 R, 423/242 A, 244 R, 244 A, 415 A, 648.1, 650; 422/241; 252/373; 48/197 R, 197 FM, 194 FM, 200, 201, 202, 210, 211, 212, 213, 214 R, 215

[56] References Cited

U.S. PATENT DOCUMENTS

| | | | |
|---|---|---|---|
| 1,799,885 | 4/1931 | Chavanne | 48/203 |
| 2,644,745 | 7/1953 | Hemminger | 48/203 |
| 2,709,676 | 5/1975 | Krebbs | 208/53 |
| 3,607,156 | 9/1971 | Schlinger et al. | 48/206 |
| 3,607,157 | 9/1971 | Schlinger et al. | 48/206 |
| 3,673,080 | 6/1972 | Schlinger et al. | 208/131 |
| 4,328,008 | 5/1982 | Muenger et al. | 48/197 R |
| 4,441,670 | 10/1983 | Marion et al. | 48/197 R |
| 4,472,171 | 9/1984 | Broderick | 48/62 R |
| 4,598,652 | 7/1986 | Hepworth | 423/230 |
| 4,671,804 | 6/1987 | Najjar | 252/373 |
| 4,705,536 | 11/1987 | Becker et al. | 252/373 |
| 4,776,860 | 10/1988 | Najjar et al. | 252/373 |
| 4,781,731 | 11/1988 | Schlinger | 252/373 |
| 4,784,670 | 11/1988 | Najjar | 48/197 R |
| 4,801,402 | 1/1989 | Najjar et al. | 48/197 R |

Primary Examiner—John Doll
Assistant Examiner—Jeffrey Edwin Russel
Attorney, Agent, or Firm—Robert A. Kulason; James J. O'Loughlin; Albert Brent

[57] ABSTRACT

Synthesis gas is produced by the partial oxidation of a feedstock comprising sulfur and ash-containing heavy liquid hydrocarbonaceous fuels, solid carbonaceous fuels, or mixtures thereof. An iron-containing additive is introduced into the reaction zone along with the feed to produce first and second liquid phase washing agents that collect and transport the vanadium-containing oxide laths and spinels and other ash components out of the reaction zone. A gaseous slag fludizing agent is also introduced into the top of the reaction zone so tha the gasifier is operated at a uniform temperature throughout under conditions that maximize the fluidity of the molten slag over the full opereating temperature range in the gasifier. Equilibrium oxygen and sulfur concentrations are provided in the gas phase in the reaction zone which provide specific partial pressures. By this method substantially all of the molten slag having a reduced viscosity and containing the nickel and vanadium-containing impurities from the feedstock are readily removed from the walls of the gas generator at a lower temperature. Simultaneously, in-situ desulfurization of the feedstock takes place in the gasifier so that the raw effluent product gas may leave the gasifier containing less than about 1.00 mole % of $H_2S$ and COS. In one embodiment, an additional supplemental gas e.g. free-oxygen, $H_2S$, COS, $SO_2$, and mixtures thereof may be introduced into the gasifier so as to increase the carbon conversion without increasing the temperature in the reaction zone; or to prevent the formation of free-iron.

34 Claims, No Drawings

PARTIAL OXIDATION PROCESS

This is a continuation-in-part of copending applications Ser. No. 07/051,982, filed May 19, 1987, now U.S. Pat. No. 4,826,627; and Ser. No. 07/100,673, filed Sept. 24, 1987, now U.S. Pat. No. 4,803,386.

FIELD OF THE INVENTION

This invention relates to the partial oxidation of sulfur and ash-containing heavy liquid hydrocarbonaceous fuels, solid carbonaceous fuels, or mixtures thereof to produce gaseous mixtures comprising $H_2+CO$ which are substantially free from molten slag and sulfur-containing gases. More particularly it pertains to an additive system for in-situ desulfurization and simultaneous removal of nickel and vanadium-containing contaminants along with other molten ash components which are produced during the partial oxidation of heavy liquid hydrocarbonaceous fuel and/or solid carbonaceous fuel. Synthesis gas, reducing gas, or fuel gas may be thereby produced which are substantially free from molten ash and sulfur-containing gases.

The partial oxidation of liquid hydrocarbonaceous fuels such as petroleum products and slurries of solid carbonaceous fuels such as coal and petroleum coke are well known processes. Previous gasification runs with delayed petroleum coke, coal and/or ash-containing heavy liquid hydrocarbonaceous fuel gave rise to some unexpected operating problems. The ash, which normally melts and is discharged from the gasifier as a slag, was not melting completely and being discharged but was building up on the inside walls lining of reaction zone of the refractory. Slag build-up on the refractory walls near the entrance to the upper portion of the vertical free flow refractory lined reaction zone of the partial oxidation gas generator was especially troublesome. Vanadium and nickel constituents of the ash in said slag collected on the gasifier walls and formed oxides during shut-down. Upon subsequent exposure of the gasifier walls to air these deposits involving vanadium can catch fire with vanadium converting to the lower melting $V_2O_5$ or metal vanadate states. The strong solvent action of vanadium oxide on the refractory lining contributed to the clogging of the outlet in the bottom of the gasifier. Nickel impurities may under certain conditions form troublesome nickel carbonyl deposits downstream in the system. Fluxing as used in coal operations and in U.S. Pat. No. 1,799,885 and 2,644,745 do not provide a solution to applicant's problem involving troublesome vanadium and nickel. The subject invention is an improvement in the art since it permits long time operation of the partial oxidation gas generator without shut-down due to failure of the refractory lining in the reaction zone. Further, the product gas containing mixtures of $H_2+CO$ is produced containing substantially no corrosive sulfur-containing gases.

The foreseeable trend for petroleum reserves is that the produced crude will be increasingly heavier and of poorer quality. To compensate for this trend, refiners must employ more "bottom of the barrel" upgrading to provide the desired light products. The current industry workhorse to provide this upgrading is some type of coking operation (either delayed or fluid). A good deal of current refinery expansion includes the installation or expansion of coker units, and thus, coking will be a process of general use for some time to come.

A major drawback for coking is the disposal of the product coke. With a reasonably clean coker feed, the product coke has been substituted for applications requiring only relatively pure carbon, such as electrode manufacture. However, with the feed crudes becoming poorer, there are compounding factors affecting coker operations. First, since the crudes contain more contaminants, i.e. sulfur, metals (predominately vanadium, nickel, and iron), and ash, and these contaminants are concentrated in the product coke, this coke is of a much poorer quality and is excluded from its normal product applications. Second, because the crudes are heavier, i.e., contain more coke precursors, more of this poorer quality coke is produced from each barrel of ash-containing heavy liquid hydrocarbonaceous fuel. The manufacture of petroleum coke pellets by a delayed coking process is described in coassigned U.S. Pat. No. 3,673,080. A fluid coking process is described in U.S. Pat. No. 2,709,676.

The Texaco partial oxidation gasification process is an established processing route for solid carbonaceous fuels including petroleum coke and coal, as well as for ash-containing heavy liquid hydrocarbonaceous fuel. For example, water slurries of petroleum coke are reacted by partial oxidation in coassigned U.S. Pat. No. 3,607,157. Gasification is often cited as a convenient means of coke disposition. The decision to use gasification as a coke disposal means is generally based on economics. The expected rise in energy costs and the economic necessity for the total use of feed crude should shortly bring about a greater utilization of comparatively low cost sulfur and ash-containing heavy liquid hydrocarbonaceous fuel and solid carbonaceous fuel as feeds in the partial oxidation process for producing gaseous mixtures comprising $H_2+CO$. By the subject process, build-up of slag on the inside walls of the gasifier is substantially eliminated. Further, in-situ desulfurization is provided for by the process.

SUMMARY OF THE INVENTION

This is a process for the production of gaseous mixtures comprising $H_2+CO$ by the partial oxidation of a feedstock comprising a heavy liquid hydrocarbonaceous fuel having a nickel and vanadium-containing ash or petroleum coke having a nickel and vanadium-containing ash, or mixtures thereof. Further, said feedstock includes a minimum of 0.1 wt. % of sulfur and greater than about 7 ppm, such as about 10 parts per million (ppm) to about 70,000 ppm of silicon; say in the range of greater than about 350 ppm to about 10,000 ppm of silicon; and said ash includes a minimum of 2.0 wt. % of vanadium, and a minimum of 1.0 wt. % of nickel, such as 2.0 to 5.0 wt. %. The process includes the steps of (1) mixing together an iron-containing additive with said feedstock; wherein the weight ratio of iron-containing additive to ash in the reaction zone in (2) is in the range of about 0.1–10.0 to 1.0, and there is at least 2 parts by weight of iron for each part by weight of vanadium; (2) reacting said mixture from (1) at a pressure in the range of about 2 to 250 atmospheres in a down-flowing free-flow unobstructed refractory lined vertical partial oxidation reaction zone of a gasifier with a free-oxygen containing gas in a reducing atmosphere and in the presence of a gaseous slag fluidizing agent which is introduced at the top of the reaction zone in a sufficient amount so as to maintain a uniform temperature throughout the reaction zone in the range of about 2100° F. to 3000° F. and said gaseous slag fluidizing agent is selected from the group consisting of superheated steam, $CO_2$, and mixtures thereof, to produce a hot raw effluent gas stream comprising $H_2+CO$ and entrained molten slag; wherein an equilibrium oxygen concentration is provided in the gas phase in the reaction zone with a partial pressure in the range of about $1.18\times10^{-13}$ to $5.64\times10^{-9}$ atmospheres, an equilibrium sulfur concentration is provided in the gas phase in the reaction zone with a partial pressure in the range of about $2\times10^{-6}$ to $2.12\times10^{-4}$ atmospheres, the free O/C atomic ratio is in the range of about 0.6 to 1.6, the $H_2O$/liquid hydrocarbonaceous and/or solid carbonaceous fuel weight ratio is in the range of about 0.1 to 5.0, and about 90 to 99.9 wt. % of the carbon in said liquid hydrocarbonaceous fuel and/or solid carbonaceous fuel is converted into carbon oxides; and where in said reaction zone a first portion of said iron-containing additive combines with at least portion of said nickel, iron, and sulfur constituents found in the feedstock to produce a first liquid phase washing agent, a second portion of said iron-containing additive combines with at least a portion of the silicon, aluminum, calcium, sodium and/or potassium and iron constituents found in the feedstock to produce a second liquid phase washing agent; and wherein the first and second liquid phase washing agents collect and transport substantially all of the vanadium-containing oxide laths and spinels and other ash components and refractory out of the reaction zone, and there is substantially no build-up of slag on the inside walls of the reaction zone; and (3) separating nongaseous materials from said hot raw effluent gas stream. In a preferred embodiment, gaseous mixtures of $H_2O$ and substantially all of the sulfur-containing gases produced in the process are recycled to the gas generator for use as at least a portion of the slag fluidizing agent.

In still another embodiment, a mixture of heavy liquid hydrocarbonaceous fuel having a nickel and vanadium-containing ash and said iron-containing additive is fed to a coker unit to produce petroleum coke with a nickel and vanadium-containing ash, and with said additive being uniformly dispersed throughout. This petroleum coke is then reacted in the partial oxidation gas generator to produce synthesis gas, reducing gas, or fuel gas.

The problem associated with slag-buildup on refractory walls of the partial oxidation gas generator, and others are minimized by the subject process in which the amount of slag containing vanadium constituents which remains in the reaction zone is substantially reduced or eliminated. Advantageously, the subject invention provides a gaseous slag fluidizing agent and an improved method of operation so that the molten slag flows freely by gravity out of the gasifier. Further, a means of introducing this addition agent into the system to give maximum effectiveness is provided. In addition, substantially all of the sulfur in the fuel is simultaneously removed along with the molten slag. In-situ desulfurization of the feedstock takes place in the gasifier so that the raw effluent gas may leave the gasifier containing less than about 1.00 mole %, such as less than about 0.6 mole %, of $H_2S$ and COS.

DISCLOSURE OF THE INVENTION

The partial oxidation of heavy liquid hydrocarbonaceous fuel and solid carbonaceous fuel e.g. petroleum coke are described respectively in coassigned U.S. Pat. Nos. 4,411,670 and 3,607,156, which are incorporated herein by reference. Further, suitable free-flow unobstructed vertical refractory lined gas generators and burners that may be used in the production of synthesis gas, reducing gas, or fuel gas from these materials are also described in the aforesaid references. Preferably, the vertical cylindrical shaped reaction zone has two coaxial inlet and outlet orifices or passages. These are centrally located in the top and bottom of the reaction zone. Advantageously, the subject process uses relatively inexpensive feedstocks comprising heavy liquid hydrocarbonaceous fuel and/or solid carbonaceous fuel feedstocks having nickel and vanadium-containing ashes. Further, said feedstock includes a minimum of 0.1 wt. % of sulfur, such as at least 2.0 wt. % sulfur; and greater than about 7, such as about 10 parts per million (ppm) to about 70,000 ppm of silicon; say in the range of greater than about 350 ppm to about 10,000 ppm of silicon; and said ash includes a minimum of 2.0 wt. % of vanadium and, a minimum of 1.0 wt. % of nickel, such as 2.0 to 5.0 wt. %.

By definition, the term sulfur-containing heavy liquid hydrocarbonaceous material or fuel having a nickel and vanadium-containing ash is a petroleum or coal derived fuel selected from the group consisting of virgin crude, residua from petroleum distillation and cracking, petroleum distillate, reduced crude, whole crude, asphalt, coal tar, coal derived oil, shale oil, tar sand oil, and mixtures thereof.

By definition, the term sulfur-containing solid carbonaceous fuel having a nickel and vanadium-containing ash is a solid fuel selected from the group consisting of coal, coke from coal, lignite; residue derived from coal liquefaction; oil shale; tar sands; petroleum coke; asphalt; pitch; particulate carbon (soot); and mixtures thereof. The petroleum coke is made from ash-containing heavy liquid hydrocarbonaceous fuel by conventional coking methods such as by the delayed or fluid coking process, such as described in coassigned U.S. Pat. No. 3,673,080, which is incorporated herein by reference.

Closer study of the ashes derived from the partial oxidation, without an additive, of a feedstock comprising heavy liquid hydrocarbonaceous fuels and/or solid carbonaceous fuel having nickel and vanadium-containing ashes shows that they are largely composed of oxide and sulfide compounds of vanadium, nickel, iron, silicon, aluminum, and magnesium, along with some normally occurring mineral matter species. Vanadium-containing oxide laths are present and may be selected from the group consisting of V, V+Ca, V+Fe, V+Al, and mixtures thereof. Vanadium-containing spinels are present and may include any metals selected from the group consisting of V, Fe, Cr, Al, Mg and mixtures thereof. The presence of abundant interlocking needle to lath-like crystals is the cause of the high viscosity of the slag.

Petroleum coke is the preferred solid carbonaceous fuel in the subject process. The amount of vanadium and nickel is significantly greater in petroleum coke than in coal. Accordingly, the metals present in the ash provide a system that is significantly different from that occurring in coal. A further factor is that the total ash content of the petroleum coke or heavy liquid hydrocarbonaceous fuel may be only about one-half to 5 weight percent (wt. %), whereas coal typically contains 10-20 wt. % ash. The comparatively low ash concentration in petroleum coke and heavy liquid carbonaceous fuel may be the reason why the ash removal problem is only noticed after prolonged gasifier runs. The chance for effective ash and additive mixing that is necessary to wash the vanadium constituents out of the reaction zone or for effective fluxing is therefore greatly reduced. It is theorized that in the heavy liquid hydrocarbonaceous material and petroleum coke systems, a good deal of the ash material is liberated as individual molecular species. This is because upon vacuum distillation or coking, the metallic species in the crude, which are generally presented as porphyrin type structures (metal atoms, oxides or ions thereof confined in an organic framework), are entrapped within the collapsed carbon matrix.

Problems arise when the heavy metal constituents build-up in the partial oxidation gasification system. In particular, vanadium and nickel are known to accumulate on the ceiling and walls of the refractory lined reaction zone of the partial oxidation gas generator and not flow smoothly from the gasifier under normal gasifier conditions. This is especially prevalent in the area where the burner discharges through the top dome of the gasifier at the entrance to the down-flowing vertical free-flow unobstructed refractory lined gasification chamber. During shut down and subsequent exposure of the gasifier walls to air, these deposits involving vanadium can catch fire with the vanadium converting to the lower melting $V_2O_5$ or metal vanadate states. These materials prove to be very corrosive to refractory thereby decreasing the life of the refractory lining of the reaction zone.

The vertical refractory lined free-flow unobstructed gas generator used in the subject process is shown and described in coassigned U.S. Pat. No. 4,472,171, which is incorporated herein by reference. It was found that the temperature in the upper region near the top of the vertical, cylindrical-shaped reaction zone when operating in the normal manner was about 100° F. to 300° F. greater than the temperature of 1700° F. to 2800° F. which prevailed in the rest of the gasifier. This temperature differential contributed to slag sticking and build-up on the walls of the gasifier in the upper region. $H_2O$ is regularly introduced into the reaction zone in the amount so that the weight ratio of $H_2O$/liquid hydrocarbonaceous fuel and/or solid carbonaceous fuel weight ratio is in the range of about 0.1 to 5.0, such as about 0.2 to 0.9. The $H_2O$ may be introduced as the liquid or gaseous carrier for the solid carbonaceous fuel or the liquid hydrocarbonaceous fuel. It also moderates the exothermic reactions going on in the reaction zone. In the subject process, in addition to the aforesaid amount of $H_2O$ a supplemental amount of a gaseous slag fluidizing agent is introduced into the reaction zone. By the subject process, a uniform temperature prevails over the entire gasifier. Further, throughout the reaction zone of the gasifier, the temperature does not vary more than ±150° F. Unexpectedly, by means of applicants' invention, a greater amount of sulfur is removed from the reaction zone as a portion of the molten slag, the fluidity of the molten slag is increased, and the inside walls of the entire gasifier are clean and free-from build-up of slag.

The gaseous slag fluidizing agent is selected from the group consisting superheated steam, $CO_2$ and mixtures thereof. For example, high pressure superheated steam about 20 to 1000 psi may be used. Sufficient gaseous slag fluidizing agent is introduced to the gasifier so as to reduce the temperature in the upper region of the reaction zone near the top of the gas generator about 100° F. to 300° F. so as to maintain a uniform temperature throughout the reaction zone in the range of about 2100° F. to 3000° F.±150° F. For example, the amount of said gaseous slag fluidizing agent that is introduced into the reaction zone may be in the amount of about 1 to 20% of the amount of $H_2O$ introduced into the reaction zone without the introduction of said gaseous slag fluidizing agent. The gaseous slag fluidizing agent is introduced into the reaction zone in at least one of the following ways:

(1) In admixture with said free-oxygen containing gas and/or in admixture with liquid hydrocarbonaceous or solid carbonaceous fuel.
(2) By way of a separate passage in a partial oxidation annular type burner.
(3) By way of at least one injection port which passes through the top dome or the side walls near the top of the vertical refractory lined steel gasifier.

In other embodiments of the subject invention to be further described, an additional amount of a supplemental gaseous material selected from the group consisting of free-oxygen containing gas, $H_2S$, $COS$, $SO_2$ and mixtures thereof is introduced into the reaction zone along with, said gaseous slag fluidizing agent. For example, the supplemental gaseous material may be introduced into the reaction zone as a separate stream or in admixture with one of the other feed streams, such as in admixture with the gaseous slag fluidizing agent.

An iron-containing additive comprising an iron compound, preferably iron oxide, in admixture with the fuel feedstock is introduced into the partial oxidation gas generator. In the reaction zone of the gas generator, a first portion of the iron-containing additive combines with at least a portion, such as substantially all or a large fraction e.g. about 90 to 97 wt. of the nickel and about 30 to 90 wt %, say about 50 to 70 wt. % of the iron and sulfur constituents found in the feedstock to produce a first low viscosity liquid phase washing agent or carrier. Minor amounts e.g. less than about 5 wt. % of the amount present in the feedstock, of other elements from the feedstock may be picked up by the first liquid phase washing agent and dissolved therein. Accordingly, a minor amount of at least one extraneous element selected from the group consisting of Al, Ca, V, Si, Ti, Mg, Mn, Na, K, and mixtures thereof may be present in the first liquid phase washing agent. A second portion of the iron-containing additive combines with at least a portion, such as substantially all or a large fraction e.g. about 40 to 100 wt. %, say about 70 to 90 wt. % of the silicon, aluminum, calcium, sodium and/or potassium, and a portion e.g. 5 to 70 wt. %, of the remainder of the iron constituents found in the feedstock to produce a second liquid phase washing agent. Any remaining iron may go to the vanadium-containing spinel phase. Minor amounts e.g. less than about 5 wt. % of the amount present in the feedstocks, of other elements from the feedstock may be picked up by the second liquid phase washing agent and dissolved therein. Accordingly, a minor amount of at least one extraneous element selected from the group consisting of Ni, V, S, Mg, Cr, and mixtures thereof may be present in the second liquid phase washing agent. Advantageously, by the subject process the $S_2$ potential in the process gas stream and downstream gas cleaning costs are substantially reduced or possibly eliminated.

The relative proportion of first and second liquid phase washing agents present in the reaction zone depends on the temperature prevailing in the reaction zone and the materials present. An elemental analysis of the first liquid phase washing agent substantially comprises in wt. %: iron about 40 to 80, such as about 60 to 70; nickel about 0.1 to 5, such as about 1 to 10; and sulfur about 10 to 32, such as about 15 to 30. The extraneous elements which may be present in the first liquid phase washing agent in the reaction zone include in wt. % vanadium about 0.1 to 3, such as about 0.2 to 1.0; silicon about 0.01 to 3, such as about 0.5 to 1.5; and aluminum about 0.01 to 3, such as about 0.4 to 1.2. It was unexpectedly found that most of the nickel e.g. 99 wt. % or more goes into the first liquid phase washing agent. An elemental analysis of the second washing agent substantially comprises in wt. %: iron about 5 to 40, such as about 10 to 30; aluminum about 5 to 20, such as about 8 to 12; silicon about 20 to 50, such as about 30 to 40; calcium about 1.0 to 35, such as about 5 to 15; and sodium and/or potassium about 0.01 to 5, such as about 0.5 to 2. The extraneous elements which may be present in the second liquid phase washing agent in the reaction zone include in wt. % vanadium about 0.2 to 5, such as about 0.5 to 2; and sulfur about 0.01 to 1.5, such as about 0.1 to 1.0.

It was unexpectedly found that these liquid phase washing agents have strong wetting capabilities for the high temperature non-flowing vanadium-containing oxide laths and spinels. These washing agents function in a completely different manner than that of a fluxing additive which may be used for example to solubilize slag constituents in coal. For example, these washing agents do not solubilize the troublesome vanadium-containing oxide laths and spinels. Rather, they serve as carriers and wash them out of the reaction zone. These washing agents wash at least a portion, such as from about 80 to 100 wt. %, say about 85 to 95 wt. %, and preferably all of the vanadium-containing contaminants out of the reaction zone of the partial oxidation gas generator. The mixtures of the first and second liquid phase washing agent and vanadium oxide laths and spinels are referred to herein as slag. The vanadium-containing oxide laths and spinels contain (i) substantially all e.g. about 80 to 99 wt. % or a large fraction e.g. about 85 to 95 wt. % of the vanadium present in the feed; (ii) the remainder of the Fe, Al, Mg, Ti, and other minor impurities from the iron-containing additive and/or feedstock; and (iii) refractory components. The vanadium-containing oxide laths and spinels comprise about 1 to 10 wt. %, such as about 4 to 8 wt. % of vanadium oxide.

The first liquid phase washing agent is present in the amount of about 90 to 99.5 wt. %, (basis total weight of first and second washing agents), such as about 92 to 96 wt. %. The second liquid phase washing agent is present in the amount of about 0.5 to 10 wt. % such as about 1 to 2 wt. %. The two liquid phase washing agents are substantially immiscible in each other. For example, the solubility of the first liquid phase washing agent in the second liquid phase washing agent is only about 0.05 to 2.0 wt. %. Actually, with the exception of the vanadium-containing laths and spinels, the first liquid phase washing agent does a better job than the second liquid phase washing agent in washing out of the reaction zone the particulate matter entrained in the hot raw effluent gas stream from the reaction zone. In general, the vanadium-bearing spinels tend to concentrate in the second liquid phase washing agent rather than in the first liquid phase washing agent. In some cases when the amount of the second liquid phase washing agent is less than 10 wt. %, the vanadium-bearing spinels have been so abundant that they actually constitute a more or less continuous mass with the second liquid phase washing agent. It is apparent that the vanadium-bearing spinels form very early in the crystallization sequence. Further, they have very high melting points and the grains composed of major proportions of them are rigid to very viscous at very high temperatures. The first liquid phase washing agent in contrast with the second liquid phase washing agent, have much lower melting points, and much lower viscosities. However, they also contain very much less of the vanadium-containing spinels. For example, the melting point and viscosity of the first liquid phase washing agent are in the range of about 1900° to 2200° F., and about 5 to 120 poises respectively; whereas, the melting point and viscosity of the second liquid phase washing agent are in the range of about 2150° to 2475° F., and about 100 to 1200 poises, respectively.

The distribution of iron between the first and second liquid phase washing agents is influenced by the equilibrium oxygen and sulfur concentrations in the gas phase in the reaction zone. This is specified by the partial pressures of the oxygen and/or $S_2$ gas in the reaction zone. The lower the partial pressure of oxygen and/or $S_2$ gas at a given temperature, the more iron is driven into the first liquid phase washing agent in preference to the second liquid phase washing agent. The formation of elemental iron in the reaction zone leads to difficulties with slag removal. In order to prevent elemental iron for forming, the partial pressure in atmospheres of the oxygen and/or $S_2$ gas in the reaction zone of the gasifier at a specific temperature is kept slightly above that calculated by Formula I and/or II below.

The relationship between the temperature in the reaction zone (T° Fahrenheit), and the common logarithm of the equilibrium partial pressure of free-oxygen gas "log $P_{(O2)}$" in atmospheres in the reaction zone is shown by Formula I. When the equilibrium partial pressure of oxygen gas in the reaction zone drops below that calculated in Formula I, then sufficient supplemental free-oxygen containing gas is introduced into the reaction zone to restore the equilibrium partial pressure of the oxygen gas in the reaction zone to a value which is slightly above that calculated in Formula I. Additions of supplemental free-oxygen containing gas in excess of that required to do the job are economically unattractive. Further, they will reduce the efficiency of the process and should be avoided.

$$\log P_{(o2)} = -38.9691 + 0.01744 \, T° \, F. - 0.0000024 \, T^2 \qquad I$$

wherein: T is the temperature in the reaction zone and is in the range of about 2100° F. to 3000° F.

For example, when the temperature in the reaction zone is 2100° F., a first value for the equilibrium partial pressure of oxygen in the reaction zone, as determined by Formula I, is about $1.18 \times 10^{-13}$ atmospheres. This value for the partial pressure of oxygen gas in the reaction zone is compared with a second value of the partial pressure of oxygen which is determined by conventional calculations for the reactions going on in the reaction zone of the gasifier. When the second value for the partial pressure of oxygen is less than the value calculated from Formula I then sufficient supplemental free-oxygen containing gas e.g. air, oxygen, oxygen-enriched air is introduced into the reaction zone to bring the partial pressure of oxygen to a value which is slightly above $1.18 \times 10^{-13}$ atmospheres, such as to about $10^{-12}$ atmospheres or above. The term "slightly above" means an increase of about 3%. Over the reaction temperature range of 2100° to 3000° F. and an atomic O/C ratio in the range of about 0.6 to 1.6, the equilibrium partial pressure of oxygen in the reaction zone will increase in the range of about $1.18 \times 10^{-13}$ to $5.64 \times 10^{-9}$ atmospheres.

As previously mentioned, elemental iron may be prevented from forming in the reaction zone of the partial oxidation gas generator by maintaining the partial pressure of $S_2$ gas in the reaction zone above the value calculated from Formula II below for the specified reaction zone temperature. The relationship between the temperature in the reaction zone (T° Farhrenheit), and the common logarithm of the equilibrium partial pressure of $S_2$ gas "log $P_{(S2)}$" in atmospheres in the reaction zone is shown in Formula II. When the equilibrium partial pressure of the $S_2$ gas in the reaction zone drops below that calculated in Formula II, then sufficient supplemental elemental sulfur or a sulfur-containing material is introduced into the reaction zone to bring the equilibrium partial pressure of the $S_2$ gas in the reaction zone to a value which is slightly above that calculated in Formula II. Additions of supplemental elemental sulfur or sulfur-containing materials in excess of that required to do the job are economically unattractive and should be avoided. Further, costly downstream purification steps for the $S_2$ gas may be then avoided.

$$\log P_{(S2)} = -17.3454 + 0.007857 \, T° F. - 0.0000011 \, T^2 \, °F. \quad \text{II}$$

wherein: T is the temperature in the reaction zone is in the range of about 2100° F. to 3000° F.

For example, when the temperature in the reaction zone is 2100° F., the equilibrium partial pressure of $S_2$ gas in the reaction zone, as determined by Formula II, is about $2 \times 10^{-6}$ atmospheres. This value for the partial pressure of $S_2$ gas in the reaction zone is compared with a second value for the partial pressure of $S_2$ gas which is determined by conventional calculations for the reactions going on in the reaction zone of the gasifier. When the second value for the partial pressure of $S_2$ gas is less than the value calculated from Formula II, then sufficient supplemental elemental sulfur or sulfur-containing material e.g. metal sulfides, $H_2S$, COS, $SO_2$ are introduced into the reaction zone to restore the equilibrium partial pressure of $S_2$ gas to a value which is slightly above $2 \times 10^{-6}$ atmospheres, such as about $10^{-5}$ atmospheres. The term "slightly above" means an increase of about 3% Over the reaction temperature range of 2100° to 3000° F., the equilibrium partial pressure of sulfur in the reaction zone will increase in the range of about $2 \times 10^{-6}$ to $2.12 \times 10^{-4}$ atmospheres.

Further, it was unexpectedly found that the additional amount of free-oxygen, over and above that normally supplied to the gas generator as determined for example, by conventional thermal and weight balances may be added to the gasifier without substantially increasing the temperature in the reaction zone. Higher carbon conversions were thereby achieved at substantially the same gasification temperature. The fluidity of the molten slag was maintained, deposition of solid deposits on the gasifier walls was reduced, and the formation of metallic iron was thereby prevented. Preferably, the additional amount of free-oxygen containing gas is such that the equilibrium partial pressure of oxygen in the gas phase, as determined by Formula I, is increased about 1 to 20% over that determined from Formula I without the additional amount of free-oxygen containing gas. The additional amount of free-oxygen containing gas may be introduced into the reaction zone as a separate stream or in admixture with at least one of the following: the original free-oxygen containing gas, the original temperature moderator, the gaseous slag fluidizing agent, and mixtures thereof.

Also, the additional amount of sulfur-containing gas selected from the groups consisting of $SO_2$, $H_2S$, and mixtures thereof may be added to the gasifier without substantially increasing the temperature in the reaction zone. Formation of metallic iron may be thereby prevented, the fluidity of the molten slag is maintained, and the deposition of solid deposits on the gasifier walls is reduced. Preferably, the additional sulfur-containing gas is such that the equilibrium partial pressure of sulfur in the gas phase as determined by Formula II, is increased about 0.1 to 5% over that determined from Formula II without the additional amount of sulfur-containing gas. The additional amount of sulfur-containing gas may be introduced into the reaction zone as a separate stream, or in admixture with the gaseous slag fluidizing agent, and mixtures thereof.

A suitable amount of iron-containing additive is introduced into the reaction zone along with the fuel feedstock in order to satisfy the following two ratios: (i) a wt. ratio of iron-containing additive to ash (noncombustable material) in the reaction zone in the range of about 0.1–10.0 to 1.0, such as in the range of about 1–6 to 1; and (ii) at least 2 parts by weight, such as about 10–30, say 20 parts by weight of iron for each part by weight of vanadium. Further, the total atoms of iron in the reaction zone is in the range of about 1.3 to 3.0 times the atoms of sulfur in the fuel plus about 0.5 to 2.0 times the atoms of silicon in the ash.

Advantageously by the subject process, the two washing phases of the molten slag which are produced in the reaction zone have low viscosities in comparison with prior art high viscosity slag. This facilitates slag removal. Further, at shut-down of the gasifier, the inside surfaces of the top dome and refractory walls of the reaction zone are provided clean and with substantially no deposits of slag.

The partial oxidation reaction takes place in a reducing atmosphere under the following conditions: temperature 2100° F. to 3000° F., such as about 2300° F. to 2600° F.; say about 2725° F. to 2825° F.; pressure about 2 to 250 atmospheres, $H_2O$/fuel weight ratio is in the range of about 0.1 to 5.0, such as about 0.2 to 0.9; and atomic ratio of free oxygen to carbon in the fuel (O/C ratio) is in the range of about 0.6 to 1.6, such as about 0.8 to 1.4. About 90 to 99.9 wt. % of the carbon in the fuel is converted into carbon oxides.

The composition of the hot, raw effluent gas stream directly leaving the free-flow unobstructed vertical refractory lined reaction zone of the partial oxidation gas generator is about as follows, in mole percent: $H_2$ 10 to 70, CO 15 to 57, $CO_2$ 0.1 to 30, $H_2O$ 0.1 to 20, $CH_4$ nil to 60, $H_2S$ nil to 0.5, COS nil to 0.05, $N_2$ nil to 60, and $A_r$ nil to 2.0. Particulate carbon is present in the range of about 0.2 to 20 weight % (basis carbon content in the feed). Ash is present in the range of about 0.5 to 5.0 wt. %, such as about 1.0 to 3.0 wt. % (basis total weight of fuel feed). Depending on the composition after removal of the entrained particulate carbon and ash by quench cooling and/or scrubbing, the gas stream may be employed as synthesis gas, reducing gas or fuel gas.

The preferred iron-containing additive for mixing with the heavy liquid hydrocarbonaceous material having a nickel and vanadium-containing ash or petroleum coke having a nickel and vanadium-containing ash is selected from the group consisting of elemental iron; iron compounds including oxides, sulfides, sulfates, carbonates, cyanides, nitrates; and mixtures thereof. In another embodiment, the iron compound is a water soluble iron salt. In still another embodiment, the iron compound is a ferro or ferri organic compound selected from the group consisting of naphthenates, oxalates, acetates, citrates, benzoates, oleates, tartrates, and mixtures thereof.

In the subject invention the aforesaid mixture of fuel feedstock comprising heavy liquid hydrocarbonaceous fuel having a nickel and vanadium-containing ash and/or the petroleum coke having a nickel and vanadium-containing ash, and the iron-containing additive are introduced into the partial oxidation gasifier. In another embodiment, the iron-containing additive is mixed with the heavy liquid hydrocarbonaceous material having a nickel and vanadium-containing ash and the mixture is then fed into a conventional coking unit to produce petroleum coke. By this means, the finely ground iron-containing additive may be intimately mixed throughout the petroleum coke product. The preferable particle size of the comminuted iron-containing additive and the comminuted petroleum coke is in the range of ASTM E-11 Standard Sieve Designation about 210 microns to 37 microns, or below. The ingredients of the aforesaid mixtures may be separately ground and then mixed together. Alternatively, the ingredients may be wet or dry ground together. Intimate mixing of the solid materials is thereby achieved, and the particle sizes of each of the solid materials in the mixture may be substantially the same. The dry ground mixture may be mixed with water or a liquid hydrocarbonaceous material or both to produce a pumpable slurry having a solids content in the range of about 50-65 wt. % Alternatively, the solid materials may be wet ground with the liquid slurry medium. Alternatively, the mixture of particulate solids may be entrained in a gaseous medium and then introduced into the gas generator. The gaseous transport medium may be selected from the group consisting of steam, $CO_2$, $N_2$, free-oxygen containing gas, recycle synthesis gas, and mixtures thereof.

For example, a mixture comprising a high boiling liquid petroleum i.e. heavy liquid hydrocarbonaceous fuel having a nickel and vanadium-containing ash and the comminuted iron-containing additive at a temperature in the range of about 650° F. to 930° F. is introduced into a delayed coking zone, for example, by way of line 33, such as shown and described in coassigned U.S. Pat. No. 3,673,080, which is incorporated herein by reference. At a temperature in the range of about 800° F. to 895° F. and a pressure in the range of about 20 to 60 psig, uncondensed hydrocarbon effluent vapor and steam are removed overhead and petroleum coke in admixture with iron-containing additive is removed from the bottom of said delayed coking zone.

In another embodiment, a mixture comprising a high boiling liquid petroleum having a nickel and vanadium-containing ash and the comminuted iron-containing additive at a temperature in the range of about 550° F. to 750° F. is introduced into a fluidized bed coking zone for example by way of line 31, such as shown and described in U.S. Pat. No. 2,709,676, which is incorporated herein by reference. At a temperature in the range of about 1000° F. to 1200° F. and a pressure in the range of about 10 to 20 psig, uncondensed hydrocarbon effluent vapor and steam are removed overhead and said petroleum coke is removed from the bottom of said coking zone.

In other embodiments, this invention may be applied to other similar petroleum processes that produce a stream suitable for gasification. Any "bottom of the barrel" process that does not upgrade the bottoms or residue stream to extinction must ultimately produce such a stream. These streams, either liquid or normally solid but pumpable at elevated temperatures, will produce the same gasification problems discussed for coke. Thus, the invention of introducing an iron-containing additive as part of the petroleum processing prior to gasification should, depending on the specific process, produce a feedstock that will be free of the gasification problems mentioned above. Most of these processes employ vacuum distillation as a pretreatment. Accordingly, as described above, the iron-containing addition agent may be mixed with the vacuum distillation feed having a nickel and vanadium-containing ash. The additive will then emerge from the distillation column in the bottoms stream. In turn, the bottoms stream is the feed stream for the upgrading process. This incorporation of the iron-containing additive should not adversely affect these processes, and the iron-containing addition agent should ultimately emerge with the vanadium-rich residue stream from each respective process. In all of these processes, this residue stream should be suitable for gasification by partial oxidation.

In applicants' process, simultaneously with the gasification of the fuel in the reaction zone, at least about 20 wt. % of the sulfur in the fuel reacts with iron and nickel in the reaction zone to produce iron and nickel sulfide particulate matter. The remainder of the sulfur is converted into $H_2S$ and COS which leave the reaction zone in the hot raw effluent gas stream. In one embodiment the $H_2S$ and COS is separated from the effluent gas stream, for example by well-known solvent absorption processes, and recycled to the reaction zone in the gasifier, for example, along with the gaseous slag fluidizing agent. The metal sulfide particulate matter leaves the reaction zone along with the molten slag. When the molten slag drops into a water bath located in the bottom of a quench tank, such as quench water 31 in coassigned U.S. Pat. No. 4,328,008, which is incorporated herein by reference, reaction of the metal sulfides with $H_2O$ takes place to produce a gaseous stream comprising $H_2S$ and $H_2O$. In one embodiment this gaseous stream is recycled to the reaction zone, for example in admixture with said slag fluidizing agent.

Various modifications of the invention as herein before set forth may be made without departing from the spirit and scope thereof, and therefore, only such limitations should be made as are indicated in the appended claims.

WE CLAIM:

1. A process for the production of gaseous mixtures comprising $H_2$+CO by the partial oxidation of a sulfur-containing feedstock comprising a heavy liquid hydrocarbonaceous fuel having a nickel and vanadium-containing ash or a solid carbonaceous fuel having a nickel and vanadium-containing ash, or mixtures thereof; and said feedstock includes a minimum of 0.1 wt. % of sulfur, greater than about 7 parts per million of silicon; and said ash includes a minimum of 2.0 wt. % vanadium, and a minimum of 1.0 wt. % of nickel and also iron, aluminum, calcium, sodium, and/or potassium; said process comprising:

(1) mixing together an iron-containing additive with said feedstock; wherein the weight ratio of iron-containing additive to ash in the reaction zone in (2) is in the range of about 0.1–10.0 to 1.0, and there is at least 2 parts by weight of iron for each part by weight of vanadium;

(2) reacting said mixture from (1) at a pressure in the range of about 2 to 250 atmosphere in a down-flowing free-flow unobstructed refractory lined vertical reaction zone of a partial oxidation gas generator with a free-oxygen containing gas in a reducing atmosphere and in the presence of a gaseous slag fluidizing agent which is introduced at the top of the reaction zone in a sufficient amount so as to maintain a uniform temperature throughout the reaction zone in the range of about 2100° F. to 3000° F. and said gaseous slag fluidizing agent is selected from the group consisting of superheated steam, $CO_2$, and mixtures thereof, to produce a hot raw effluent gas stream comprising $H_2+CO$ and entrained molten slag; wherein an equilibrium oxygen concentration is provided in the gas phase in the reaction zone with a partial pressure in the range of about $1.18\times10^{-13}$ to $5.64\times10^{-9}$ atmospheres, an equilibrium sulfur concentration is provided in the gas phase in the reaction zone with a partial pressure in the range of about $2\times10^{-6}$ to $2.12\times10^{-4}$ atmospheres, the free O/C atomic ratio is in the range of about 0.6 to 1.6, the $H_2O$/liquid hydrocarbonaceous fuel and/or solid carbonaceous fuel weight ratio is in the range of about 0.1 to 5.0, and about 90 to 99.9 wt. % of the carbon in said liquid hydrocarbonaceous fuel and/or solid carbonaceous fuel is converted into carbon oxides; and where in said reaction zone a first portion of the said iron-containing additive combines with at least a portion of the nickel, iron and sulfur constituents found in the feedstock to produce a first liquid phase washing agent; a second portion of said iron-containing additive combines with at least a portion of the silicon, aluminum, calcium, sodium and/or potassium, and iron constituents found in the feedstock to produce a second liquid phase washing agent; and wherein the first and second liquid phase washing agents collect and transport substantially all of the vanadium-containing oxide laths and spinels and other ash components and refractory out of the reaction zone, and there is substantially no build-up of slag on the inside walls of the reaction zone; and (3) separating nongaseous materials from said hot raw effluent gas stream.

2. The process of claim 1 wherein said gaseous slag fluidizing agent in (2) is introduced into said reaction zone in admixture with said free-oxygen containing gas and/or in admixture with said liquid hydrocarbonaceous or solid carbonaceous fuel.

3. The process of claim 1 wherein said gaseous slag fluidizing agent in (2) is introduced into said reaction zone by way of a separate passage in a partial oxidation annular-type burner.

4. The process of claim 1 wherein said gaseous slag fluidizing agent in (2) is introduced into said reaction zone by way of at least one injection port.

5. The process of claim 4 wherein said injection ports pass through the dome or side walls of said gasifier, and said gasifier comprises a vertical refractory lined steel pressure vessel.

6. The process to claim 1 wherein substantially all of the sulfur in said fuel is converted into iron sulfide and nickel sulfide which leave the reaction zone in said molten slag; and the remainder of said sulfur in the fuel is converted into $H_2S$ and COS which leave said reaction zone in said hot raw effluent gas stream; and provided with the steps of separating said $H_2S$ and COS from said effluent gas stream and recylcing same to the reaction zone in (2).

7. The process of claim 6 wherein said molten slag is separated from said hot effluent gas stream and cooled in water to produce a gaseous mixture of $H_2O$ and $H_2S$; and provided with the step of recylcing said mixture of $H_2O$ and $H_2S$ to the reaction zone in (2).

8. The process of claim 1 wherein said iron-containing additive is selected from the group consisting of elemental iron; iron compounds selected from the group consisting of oxides, sulfides, sulfates, carbonates, cyanides, chlorides, and nitrates; and mixtures thereof.

9. The process of claim 1 wherein the iron containing portion of said iron-containing additive is a ferro or ferri organic compound selected from the group consisting of naphthenates, oxalates, acetates, citrates, benzoates, oleates, tartrates, and mixtures thereof.

10. The process of claim 1 wherein the iron containing portion of said iron-containing additive is a water soluble iron salt.

11. The process of claim 1 wherein an additional supplemental gaseous material selected from the group consisting of free-oxygen containing gas, $H_2S$, COS, $SO_2$ and mixtures thereof is introduced into the reaction zone.

12. The process of claim 11 wherein said supplemental gaseous material is a free-oxygen containing gas; and wherein the amount of said supplemental free-oxygen containing gas is such that the equilibrium partial pressure of oxygen in the gas phase, as determined from Formula I below, is increased about 1 to 20% over that determined from Formula I without said additional amount of free-oxygen containing gas;

$$\log P_{(O_2)} = -38.9691 + 0.01744\ T°\ F. - 0.0000024\ T^{2°}\ F. \qquad \text{I}$$

wherein: T is the temperature in the reaction zone and is in the range of about 2100° F. to 3000° F.

13. The process of claim 11 wherein said supplemental gaseous material is selected from the group of sulfur-containing gases consisting of $H_2S$, COS, $SO_2$ and mixtures thereof; and wherein the amount of said additional sulfur-containing gas is such that the equilibrium partial pressure of sulfur in the gas phase as determined from Formula II below is increased about 0.1 to 5% over that determined from Formula II without the additional amount of said sulfur-containing gas;

$$\log P_{(S_2)} = -17.3454 + 0.007857\ T°\ F. - 0.0000011\ T^2\ °F. \qquad \text{II}$$

wherein: T is the temperature in the reaction zone and is in the range of about 2100° F. to 3000° F.

14. The process of claim 1 wherein said heavy liquid hydrocarbonaceous fuel having a nickel and vanadium-containing ash feedstock is selected from the group consisting of crude residue from petroleum distillation and cracking process operations, petroleum distillate, reduced crude, whole crude, asphalt, coal tar, coal derived oil, shale oil, tar sand oil, and mixtures thereof.

15. The process of claim wherein said solid carbonaceous fuel having a nickel and vanadium-containing ash is selected from the group consisting of coal; coke from coal; lignite; residue derived from coal liquefaction; oil shale; tar sands; petroleum coke; asphalt; pitch; particulate carbon (soot); and mixtures thereof.

16. The process of claim 1 wherein said solid carbonaceous fuel is introduced into said reaction zone as a pumpable slurry entrained in a liquid carrier, or as ground particulate matter entrained in a gaseous carrier.

17. The process of claim 16 wherein said liquid carrier is selected from the group consisting of water, liquid hydrocarbonaceous fuel, and mixtures thereof; and said slurry has a solids content in the range of about 50 to 70 wt. %.

18. The process of claim 16 wherein said gaseous carrier is nitrogen or recycle synthesis gas.

19. The process of claim 1 where in (1) said iron-containing additive is introduced into the feed to or the bottoms from a vacuum distillation unit.

20. The process of claim 1 wherein said mixture of iron-containing additive and feedstock from (1) has a particle size of ASTM E-11 Standard Sieve Designation in the range of about 210 microns to 37 microns, or below.

21. The process of claim 1 wherein said iron-containing additive comprises about 30.0 to 100.0 wt. % of an iron compound.

22. The process of claim 1 wherein the first liquid phase washing agent is present in the amount of about 90 to 99.5 wt. %, (basis total weight of said first and second liquid phase washing agents).

23. The process of claim 11 wherein said supplemental free-oxygen containing material is selected from the group consisting of substantially pure oxygen, oxygen-enriched air, and air.

24. A partial oxidation process for the production of gaseous mixtures comprising $H_2 + CO$ starting with a sulfur-containing feedstock comprising a heavy liquid hydrocarbonaceous fuel having a nickel and vanadium-containing ash; and said feedstock includes a minimum of 0.1 wt. % of sulfur, greater than about 7 parts per million of silicon; and said ash includes a minimum of 2.0 wt. % vanadium, and a minimum of 1.0 wt. % of nickel, and also iron, aluminum, calcium, sodium, and/or potassium; said process comprising:

(1) mixing together with said feedstock an iron-containing additive selected from the group consisting of elemental iron; iron compounds selected from the group consisting of oxides, sulfides, sulfates, carbonates, cyanides, chlorides, nitrates; and mixtures thereof; wherein the weight ratio of iron-containing additive to ash in the reaction zone in (4) is in the range of about 0.1–10.0 to 1.0, and there is at least 2 parts by weight of iron for each part by weight of vanadium;

(2) coking said mixture from (1) by introducing said mixture at a temperature in the range of about 650° F. to 920° F. into a delayed coking zone where at a temperature in the range of about 800° F. and a pressure in the range of about 20 to 60 psig, uncondensed hydrocarbon effluent vapor and steam are removed overhead and said petroleum coke having a nickel and vanadium-containing ash and having uniformly dispersed therein said iron-containing additive is removed from the bottom;

(3) introducing the petroleum coke from (2) into the partial oxidation reaction zone in (4) as a pumpable slurry having a solids content in the range of about 50 to 70 wt. % and comprising petroleum coke in water, liquid hydrocarbonaceous fluid or mixtures thereof; or as substantially dry petroleum coke entrained in a gaseous transport medium;

(4) reacting said petroleum coke from (3) at a pressure in the range of about 2 to 250 atmosphere in a down-flowing free-flow unobstructed refractory lined vertical reaction zone of a partial oxidation gas generator with a free-oxygen containing gas in a reducing atmosphere and in the presence of a gaseous slag fluidizing agent which is introduced at the top of the reaction zone in a sufficient amount so as the maintain a uniform temperature throughout the reaction zone in the range of about 2100° F. to 3000° F. and said gaseous slag fluidizing agent is selected from the group consisting of superheated steam, $CO_2$, and mixtures thereof to produce a hot raw effluent gas stream comprising $H_2+CO$ and entrained molten slag; wherein an equilibrium oxygen concentration is provided in the gas phase in the reaction zone with a partial pressure in the range of about $1.18 \times 10^{-13}$ to $5.64 \times 10^{-9}$ atmosphere, an equilibrium sulfur concentration is provided in the gas phase in the reaction zone with a partial pressure in the range of about $2 \times 10^{-6}$ to $2.12 \times 10^{-4}$ atmosphere, the free O/C atmoic ratio is in the range of about 0.6 to 1.6, the $H_2O$/liquid hydrocarbonaceous fuel and/or solid carbonaceous fuel weight ratio is in the range of about 0.1 to 5.0, and about 90 to 99.9 wt. % of the carbon in said liquid hydrocarbonaceous fuel and/or solid carbonaceous fuel is converted into carbon oxides; and wherein said reaction zone a first portion of said iron-containing additive combines with a portion of the nickel, iron and sulfur constituents present to produce a first liquid phase washing agent; a second portion of the iron-containing additive combines with at least a portion of the silicon, aluminum, calcium, sodium and/or potassium, and iron constituents present to produce a second liquid phase washing agent; wherein the first liquid phase washing agent is present in the amount of about 90 to 99.5 wt. %, (basis total weight of said first and second liquid phase washing agents); and wherein said first and second liquid phase washing agents collect and transport substantially all of the vanadium-containing oxide laths and spinels and other ash components and refractory out of the reaction one, and there is substantially no build-up of slag on the inside walls of the reaction zone; and (5) separating nongaseous material from said hot raw effluent gas stream.

25. The process of claim 24 wherein said gaseous fluidizing agent in (4) is introduced into said reaction zone in any one or more of the following ways:
  (a) in admixture with said free-oxygen containing gas and/or in admixture with said petroleum coke;
  (b) by way of a separate passage in a partial oxidation annular-type burner; and
  (c) by way of at least one injection port passing through the dome or side walls of said gasifier.

26. The process of claim 24 wherein substantially all of the sulfur in said fuel is converted into iron sulfide and nickel sulfide which leave the reaction zone in said molten slag; and the remainder of said sulfur in the fuel is converted into $H_2S$ and COS which leave said reaction zone in said hot raw effluent gas stream; and provided with the steps of separating said $H_2S$ and COS from said effluent gas stream and recycling same to the reaction zone in (2).

27. The process of claim 26 wherein said molten slag is separated from said hot effluent gas stream and cooled in water to produce a gaseous mixture of $H_2O$ and $H_2S$; and provided with the step of recycling said mixture of $H_2O$ and $H_2S$ to the reaction zone in (2).

28. The process of claim 24 wherein said mixture of iron-containing additive and feedstock from (1) has a particle size of ASTM E-11 Standard Sieve Designation in the range of about 210 microns to 37 microns or below.

29. The process of claim 24 wherein said ash-containing heavy liquid hydrocarbonaceous fuel is a high boiling liquid petroleum feed to or the bottoms from a vacuum tower or a fractionator.

30. The process of claim 24 where in (5) said nongaseous materials are separated from said hot effluent gas stream by contacting the gas stream from (4) with a water or oil scrubbing medium.

31. The process of claim 24 wherein a sufficient amount of gaseous slag fluidizing agent is introduced into the reaction zone so as to reduce the temperature in the upper region of the reaction zone near the top of the gas generator about 100° F. to 300° F.

32. The process of claim 24 wherein an additional supplemental gaseous material selected from the group consisting of free-oxygen containing gas, $H_2S$, COS, $SO_2$ and mixtures thereof is introduced into the reaction zone.

33. The process of claim 32 wherein said supplemental gaseous material is a free-oxygen containing gas; and wherein the amount of said supplemental free-oxygen containing gas is such that the equilibrium partial pressure of oxygen in the gas phase, as determined by Formula I, below, is increased about 1 to 20% over that determined by Formula I without the additional amount of free-oxygen containing gas;

$$\log P_{(O_2)} = -38.9691 + 0.01744 \text{ T° F.} - 0.0000024 \text{ T}^2 \text{ °F.} \qquad \text{I}$$

wherein: T is the temperature in the reaction zone and is in the range of about 2100° F. to 3000° F.

34. The process of claim 32 wherein said supplemental gaseous material is selected from the group of sulfur-containing gases consisting of $H_2S$, COS, $SO_2$, and mixtures thereof; and wherein the amount of said additional sulfur-containing gas is such that the equilibrium partial pressure of sulfur in the gas phase as determined from Formula II is increased about 0.1 to 5% over that determined from Formula II without the additional amount of said sulfur-containing gas;

$$\log P_{(S_2)} = -17.3454 + 0.007857 \text{ T° F.} - 0.0000011 \text{ T}^2 \text{ °F.} \qquad \text{II}$$

wherein: T is the temperature in the reaction zone and is in the range of about 2100° F. to 3000° F.

* * * * *